United States Patent [19]

Jitaru

[11] Patent Number: 5,126,931
[45] Date of Patent: Jun. 30, 1992

[54] FIXED FREQUENCY SINGLE ENDED FORWARD CONVERTER SWITCHING AT ZERO VOLTAGE

[75] Inventor: Ionel Jitaru, Tucson, Ariz.

[73] Assignee: ITT Corporation, New York, N.Y.

[21] Appl. No.: 579,470

[22] Filed: Sep. 7, 1990

[51] Int. Cl.⁵ ........................................... H02M 3/335
[52] U.S. Cl. .......................................... 363/21; 363/91; 363/97; 363/131
[58] Field of Search ................ 363/20, 21, 91, 97, 363/127, 131

[56] References Cited

U.S. PATENT DOCUMENTS

| | | | |
|---|---|---|---|
| 3,582,758 | 6/1971 | Gunn | 363/127 |
| 3,909,700 | 9/1975 | Ferro | 363/127 |
| 3,940,682 | 2/1976 | Park et al. | 363/127 |
| 4,146,832 | 3/1979 | McConnell | 323/17 |
| 4,246,634 | 1/1981 | Purol | 363/49 |
| 4,323,962 | 4/1982 | Steigerwald | 363/127 |
| 4,386,394 | 5/1983 | Kocher et al. | 363/20 |
| 4,399,376 | 8/1983 | Onodera et al. | 363/20 |
| 4,415,959 | 11/1983 | Vinicarelli | 363/21 |
| 4,417,153 | 11/1983 | Onodera et al. | 363/21 |
| 4,441,146 | 4/1984 | Vinciarelli | 363/20 |
| 4,451,876 | 5/1984 | Ogata | 363/91 |
| 4,519,024 | 5/1985 | Federico et al. | 363/127 |
| 4,642,743 | 2/1987 | Radcliffe | 363/97 |
| 4,648,020 | 3/1987 | Vinciarelli | 363/71 |
| 4,675,797 | 6/1987 | Vinciarelli | 363/21 |
| 4,677,534 | 6/1987 | Okochi | 363/21 |
| 4,680,687 | 7/1987 | Stasch et al. | 363/18 |
| 4,709,316 | 11/1987 | Ngo et al. | 363/21 |
| 4,716,514 | 12/1987 | Patel | 363/127 |
| 4,760,512 | 7/1988 | Loftus | 363/20 |
| 4,809,148 | 2/1989 | Barn | 363/20 |
| 4,811,187 | 3/1989 | Nakajima et al. | 363/91 |
| 4,837,452 | 6/1989 | Peterson | 307/2 |
| 4,858,052 | 8/1989 | McDonnal | 363/21 |
| 4,922,404 | 5/1990 | Ludwig et al. | 363/127 |
| 4,931,920 | 6/1990 | Barker | 363/21 |
| 4,959,764 | 9/1990 | Bassett | 363/20 |
| 4,975,821 | 12/1990 | Lethellier | 363/97 |

FOREIGN PATENT DOCUMENTS 2608857 6/1988 France .
WO8904082 5/1989 PCT Int'l Appl. .

OTHER PUBLICATIONS

Lee: "Zero-Voltage Switching Techniques In DC/DC Converter Circuits"; Apr. 1987 HFPC Proceedings; pp. 15-40.
Tabisz et al.; "Novel Zero-Voltage Switched Multi-Resonant Forward Converter"; May 1988 HFPC Proceedings; pp. 309-317.

Primary Examiner—Jeffrey Sterrett
Attorney, Agent, or Firm—Thomas L. Peterson

[57] ABSTRACT

A single ended forward DC-to-DC converter is operated with a main switch in series circuit with a primary winding of the isolation transformer and an auxiliary switch for charging a reset capacitor also in circuit with said primary winding. The main switch and auxiliary switch are operated through control logic so that neither switch is ON at the same time. A predetermined dead time is provided between turning OFF the auxiliary switch and turning ON the main switch to allow the output capacitance of the main switch to discharge into the secondary of the transformer. Current discharge into the secondary of the transformer during this time period is limited either by a saturable reactor in series circuit with the secondary or a selectively controlled rectifier.

24 Claims, 10 Drawing Sheets

FIXED FREQUENCY SINGLE ENDED FORWARD CONVERTER SWITCHING AT ZERO VOLTAGE

BACKGROUND OF THE INVENTION

1. Field of the Invention

This invention relates to DC-to-DC converters, and more particularly to forward single ended converters which switch at zero voltage.

2. Description of the Prior Art

A DC-to-DC converter is a circuit which converts a direct current voltage at one level to a direct current voltage at another level. If the circuit is based upon switching the input DC current through the primary of a transformer and then rectifying it in the secondary of the transformer, the converter is called a single ended forward converter. A singled ended forward converter is gated by a single switch in series with the primary of the transformer. Energy is transferred forward from the input through the primary winding to the secondary winding of the transformer during the ON period of the switch.

One of the primary design goals in such DC-to-DC converters is to increase the amount of power transferred through the converter. One prior art approach is presented by Fred O. Barthold in "Source Volt-Ampere/Load Volt-Ampere Differential Converter", U.S. Pat. No. 4,734,839.

Common prior art DC-to-DC converter topologies include the buck or forward converter, the buck-boost or flyback converter, and the boost converter which transfer energy from the input to the output during the ON time or OFF time of the main switch. In these circuits a dead time is created during the energy transfer which results in an increased in size of the output filter. Barthold combines the forward and flyback topologies to achieve a continuous transfer of energy from the input to the output of the converter to significantly reduce the size of the output filter.

Another prior art method for increasing the power transfer through the converter is to increase the switching frequency. This results in a reduction of the size of the isolation transformer and the output filter. However, there are upper limits to the operating frequency of prior art buck converters, for example, on account of switching losses in the semiconductor switches utilized in the converters. Switching losses occur when the main semiconductor switch in the buck converter is turned ON and OFF due to the finite switching speed or the time required for the current in the semiconductor device to start and stop flowing.

In order to overcome limitations in switching speeds, the prior art has devised a new family of resonant and quasi-resonant DC-to-DC converters. In the case of quasi-resonant converters, the prior art technique consists of shaping the current or voltage to become half sinusoidal and to perform the switching when the current or voltage reaches zero. The reactive elements which contribute to shaping the current or voltage are part of the basic circuit and are considered undesirable in classic topologies because of leakage inductance and parasitic capacitance. An example of one such circuit can be found in Vinciarelli, "Forward Converter Switching at Zero Current", U.S. Pat. No. 4,415,959. The technique utilized by Vinciarelli consists of adding a resonant capacitor across the flywheeling diode to create a resonant circuit in combination with the leakage inductance of the transformer. During the ON time of the main switch, a current charges the resonant capacitor. When the current reaches zero, the main switch turns OFF in the primary of the transformer. The output inductor discharges the resonant capacitor, transferring the energy to the load. This topology eliminates switching losses which allows the converter to run at a very high frequency. However, this topology exhibits several drawbacks which limit its utilization at low and medium power levels. These drawbacks are as follows.

The peak current in such a quasi-resonant converter is significantly higher than in a conventional forward converter. The peak current becomes substantially large if a large input voltage range is required. The energy in the prior art device is transferred in stages from the input to the resonant capacitor and then from the resonant capacitor to the output. Due to the fact that the switching in the primary occurs at zero current and nonzero voltage, the energy contained in the output capacitance of the main switch is dissipated when it turns ON. Output power is varied by varying the frequency. A certain amount of energy is transferred from the input to the output at every cycle and when the power requirements are high, the repetition frequency is correspondingly high. Modulation of the frequency does not allow significant decrease of the output filter size. A large electromagnetic interference (EMI) filter is required to avoid beat frequency problems between the units, if two non-synchronized units are used together.

Another family of quasi-resonant converters which switch at zero voltage is described by F. C. Lee, "Pulse Width Modulation Technique", High Frequency Power Conversion International Proceedings (April 1987), Intertec Communications, Ventura, California. These prior art circuits operate similarly to those described above with the exception that the main switch turns ON and OFF at zero voltage. This has the advantage of eliminating the losses caused by the discharge of the capacitance of the switch at turn on and also decreases the driving current utilized in the MOSFET switch due to elimination of the Miller effect, i.e. induced increase in capacitance due to anode to cathode charging.

However, the voltage stress across the main switch and the frequency modulation which is required make this topology unattractive.

An additional group of quasi-resonant converters includes the multi-resonant converters such as were described at the High Frequency Power Conversion International Proceedings (May, 1988), Intertec Communications, Ventura, California. While operating similarly to other quasi-resonant topologies, a secondary resonant circuit is employed to decrease the stress across the output rectifier and to reduce frequency swings over various input-output conditions of operation.

What is needed is a converter which can operate constant frequency yet eliminates current or voltage stresses which are characteristic of prior art quasi-resonant converters while at the same time shaping the voltage or current only at the switching time.

BRIEF SUMMARY OF THE INVENTION

The invention utilizes a topology which uses energy accumulated in the magnetic field of the isolation transformer to discharge the output capacitance of the main switch to zero. In contrast, in the prior art technologies the magnetizing energy within the isolation transformer was either recycled back to the input source or in some cases dissipated in a snubber resistor. The discharge of the capacitance of the main switch to zero prior to TURN ON of the main switch has several advantages. For example, losses caused by energy stored in the output capacitance of the main switch are eliminated since they are internally dissipated when the main switch is turned on. Switching noise from the Miller effect is eliminated. Current spikes generated at TURN ON of the main switch due to parasitic capacitance of spikes generated at TURN ON the main switch due to parasitic capacitance of the transformer is eliminated. A low time rate of change of the voltage arising from the quasi-resonant discharge of the capacitance of the main switch is reflected as a low rate of change of voltage across the secondary windings. This significantly reduces the current spike across the secondary windings of the transformer due to cross conduction between the main rectifying diode and the flywheeling diode in the output stage. A slow rate of change of the voltage allows the flywheel diode to recover from conduction. In the preferred embodiment, a saturable reactor is used in the secondary circuit of the transformer to delay the current flow and cross conduction between the flywheel diode and the main diode is further reduced.

The power transfer to the output is modulated by varying the duty cycle, as is commonly used in constant frequency converters.

The main switch is turned OFF prior to the voltage being built up across it. This is accomplished by a fast TURN OFF scheme and also by using an external capacitor connected across the main switch. Energy accumulated in the capacitor is not discharged through the main switch, but is cycled back to the input source.

The energy contained in the leakage inductance of the transformer is not dissipated but is also recycled back to the input source.

Another advantage of the topology of the invention is its ability to reset the transformer to eliminate the DC component from the flux density in the transformer. This leads to better utilization of the core of the transformer for a single ended forward converter. One consequence of this resetting technique is the minimization of the voltage stress on the primary switch. A constant voltage is applied across the primary switch during the OFF time which is tailored to avoid the dead time. The duty cycle is not limited to a 50% constraint which is imposed by most prior art resetting techniques. The condition necessary to achieve zero voltage switching is also independent of the output current. In contrast, prior art, zero current crossing, resonant converters limit the output current in order to achieve a zero current crossing condition.

As a result of the invention switching losses are virtually eliminated; noise in the primary and secondary of the isolation transformer is significantly decreased; the available flux swing for the isolation transformer is maximized; the voltage across the main switch is minimized; limitations on the main switch duty cycle due to transformer core saturation are avoided; constraints on the output current due to zero voltage conditions are avoided; the ability to provide multiple outputs is provided; the circuit is adaptable to primary current mode control; the circuit is operable at very high frequencies without switching losses or noise; the circuit is capable of high power density conversion due to full utilization of the transformer core, high frequency operation and constant frequency operation thereby minimizing the size of the output filter; and the circuit does not require special components typical of resonant capacitors with very low equivalent series resistance.

The invention is a single ended, zero-voltage switching, forward DC-to-DC converter comprising a DC voltage source and a transformer having a primary and secondary winding. A main switch selectively couples the voltage source across the primary winding of the transformer. An auxiliary switch selectively allows the voltage across the primary winding to reach zero. The main switch and auxiliary switch each have an OFF period and ON period. The auxiliary switch is nonconductive prior to the ON period of the primary switch by a predetermined time period sufficient to allow the voltage across the primary switch circuit to reach zero voltage. The auxiliary switch remains nonconductive until the main switch cycles through its corresponding ON period and OFF period. A reset capacitor is coupled between the auxiliary switch and AC ground of the converter. A third switch is coupled in series with the secondary winding of the transformer and selectively remains at least partially nonconductive as the voltage across the primary switch reaches decreases. The third switch becomes conductive when the voltage across the primary switch reaches zero. A first rectifier is coupled in series with the third switch for conducting current from the third switch. A control circuit selectively operates the main switch, the auxiliary switch and third switch to transfer energy through the converter by modification of the duty cycle of operation of at least the main and auxiliary switch to achieve turn ON of the primary switch at zero voltage.

The converter further comprises a discrete, resonant capacitor in parallel with the primary switch.

In an alternative embodiment converter further comprising an inductor coupled in parallel across the primary winding of the transformer in series circuit with the auxiliary switch and the reset capacitor.

In one embodiment first rectifier and the third switch comprise a unidirectionally controlled switch circuit. The unidirectional controlled switch circuit is selectively operated by the control circuit so that it is nonconductive after the voltage across the primary switch reaches zero, and so that it is conductive during the corresponding ON time of the primary switch.

In another embodiment the transformer comprises a plurality of secondary windings.

In the preferred embodiment the third switch is a saturable reactor.

The converter further comprises a load and load inductor. The load inductor is coupled in series circuit between the first rectifier, third switch and load.

The converter further comprises a second rectifier coupled between ground of the secondary winding of the transformer and the input to the load inductor at its coupling to the first rectifier.

The control circuit comprises a sensory circuit for sensing voltage across the load. The control circuit maintains a constant voltage across the load by varying the ON period of the primary switch, the third switch or both.

The third switch is a saturable inductor or a synchronized rectifier.

The converter further comprises a voltage reference. The control circuit compares the difference in voltage across the load and the voltage reference. The difference is compared to a signal which is proportional to the current through the primary switch.

In one embodiment the converter further comprises a second transformer having a corresponding primary winding and secondary winding. The third switch comprises the secondary winding of the secondary transformer, and the control circuit applies a variable voltage to the primary winding of the secondary transformer.

The invention is a single ended forward converter in which energy is transferred from a primary winding to a secondary winding of a transformer during an ON period of a primary switch. Circuit is provided for recycling the magnetizing energy stored in the transformer to reset it during the OFF period of the primary switch such that discharge of output capacitance of the primary switch to zero is achieved prior to turn ON of the primary switch on a subsequent cycle. The invention comprises a reset capacitor. An auxiliary switch including an antiparallel diode is coupled in series with the reset capacitor. A switch control circuit operates the auxiliary switch including the antiparallel diode in accordance with a control logic such that:

(a) the auxiliary switch including the antiparallel diode is opened prior to the ON period of the primary switch for a period of time sufficient to discharge the output capacitance of the primary switch;

(b) the auxiliary switch including the antiparallel diode closes at the same time the primary switch opens; and (c) the auxiliary switch including the antiparallel diode is open during the ON period of the primary switch.

In the illustrated embodiment the auxiliary switch may comprise a field effect transistor in parallel with a discrete and/or body diode.

The converter further comprises a circuit for inhibiting current in the secondary winding of the transformer until the output capacitance of the primary switch is discharged.

The invention is also a method of operating a single ended forward DC-to-DC converter comprising the steps of storing energy in a primary winding of a transformer by flowing DC current through the primary winding in series circuit with a primary switch. The primary switch is then turned OFF. A secondary switch in series circuit with the primary of the transformer is turned on to charge a reset capacitor. The secondary switch is turned on after the primary switch turns off. After the charge on the reset capacitor is increased to a predetermined level, the secondary switch is turned off. The current flow through the primary winding reverses and allows the output capacitance of the primary switch to discharge into the input source. The voltage across the primary switch is thus drawn down to zero, thereby allowing the primary switch to then turn on at zero voltage. Voltage discharge across the primary switch is implemented in part and facilitated by selective opening of a third switch in series with the secondary winding of the transformer.

The invention can better be visualized by turning to the following drawings.

BRIEF DESCRIPTION OF THE DRAWINGS

FIGS. 4a-4c are a timing diagram of the circuit of FIG. 3a.

The invention and its various embodiments may be better understood by now turning to the following detailed description.

DETAILED DESCRIPTION OF THE PREFERRED EMBODIMENTS

A single ended forward DC-to-DC converter is operated with a primary switch in series circuit with a primary winding of the isolation transformer and an auxiliary switch for charging a reset capacitor also in circuit with said primary winding. The main switch and auxiliary switch are operated through control logic so that neither switch is ON at the same time. A predetermined dead time is provided between turning OFF the auxiliary switch and turning ON the primary switch to allow the output capacitance of the primary switch to discharge into the input source. Current discharge into the secondary of the transformer during this time period is limited by a third switch, which may either be a saturable reactor in series circuit with the secondary or a selectively controlled switch.

Figure 3A:
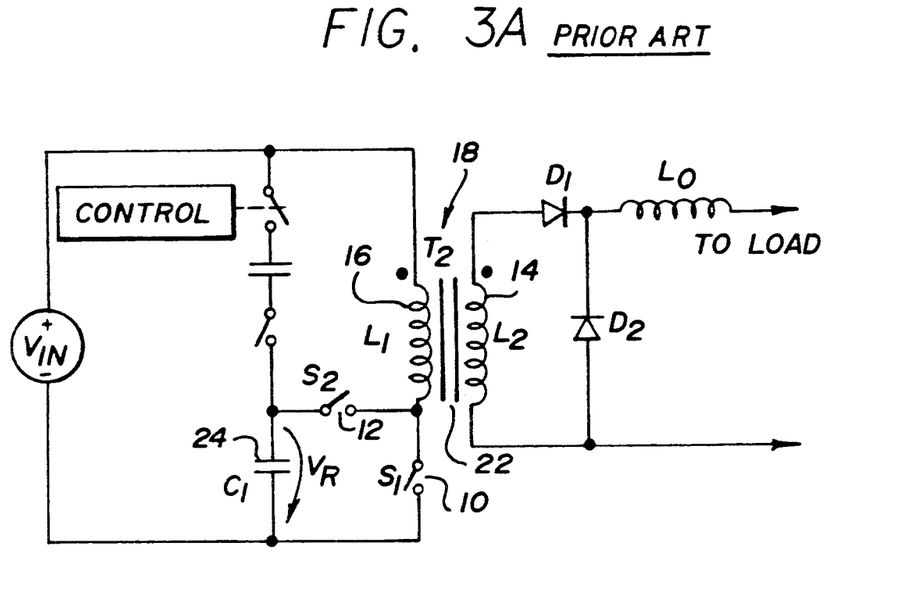
FIG. 3a is a schematic diagram wherein the current mirror resetting technique of the prior art is illustrated.
Figure 3B:
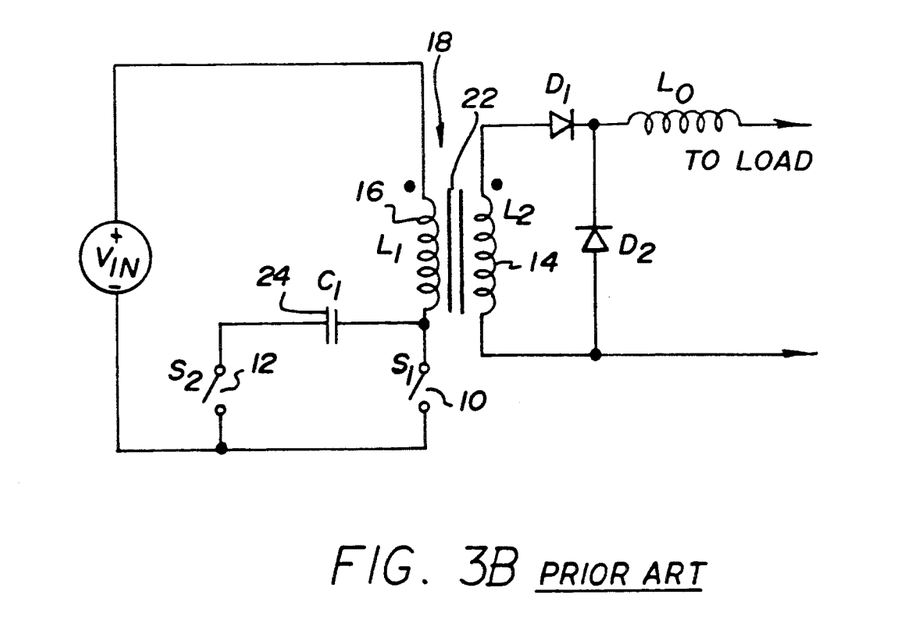
FIG. 3b is a schematic diagram wherein another prior art technique is illustrated.
Figure 4A:
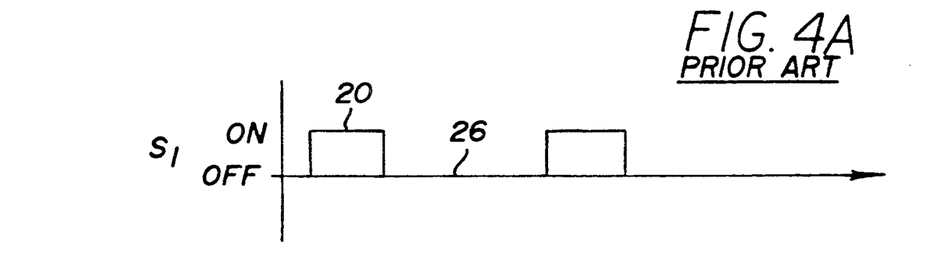
Figure 4B:
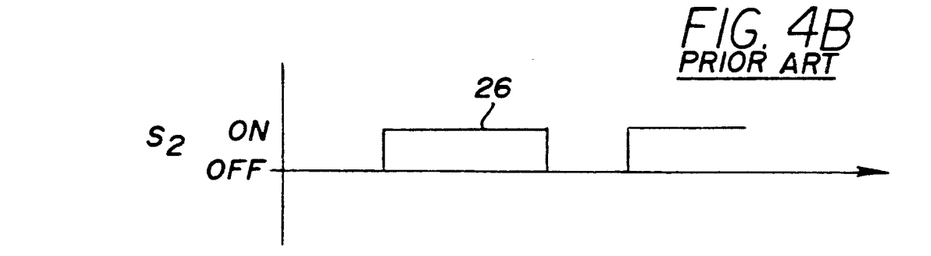
Figure 4C:
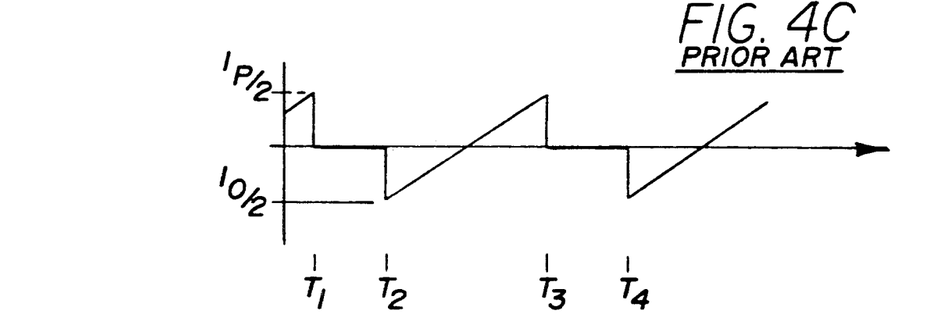

The resetting scheme methodology utilized in connection with the forward converter of the invention can best be understood by first considering prior art resetting methodologies, such as described by Vinciarelli, "Optimal Resetting of the Transformer Core in Single Ended Forwarded Converters", U.S. Pat. No. 4,441,146 (1984). FIGS. 3 and 4 illustrate this prior art current mirror methodology. An A.C. equivalent topology is shown in FIG. 3b taken from Barn, "Full-Fluxed, Single-Ended DC Converter", U.S. Pat. No. 4,809,148 (1989) where the series combination of the capacitor and auxiliary switch are coupled to the negative rail rather than the positive rail as shown in FIG. 3a taken from Vinciarelli, "Optimal Resetting of the Transformer Core in Single Ended Forwarded Converters", U.S. Pat. No. 4,441,146 (1984). For the sake of discussion ideal switches 10 and 12 are assumed in the schematic of FIG. 3a. Leakage inductance, winding capacitance and other parasitic elements reflected from transformer 18 are ignored. At time T1 in FIG. 4 switch S2, shown in FIG. 3a symbolically as a mechanical switch, but which in practice always assumes the form of a semiconductor switch, is opened. Primary switch 10, S1, is closed starting with the first ON period 20 in FIG. 4. The DC voltage Vin is impressed upon the primary winding 16 of transformer 18 causing a magnetic flux to be propagated across the core 22 of the transformer. If N is the number if primary turns, the total change in flux is Vin(T2−T1)/N. The change in magnetizing current is then given by Vin(T2−T1)/Lm where Lm is the magnetizing inductance of transformer 18.

At time T2 in FIG. 4, switch 10, S1, turns OFF and switch 12, S2, turns ON. Current then flows into capacitor 24. The energy stored in the magnetizing inductance of transformer 18 is then transferred into capacitor 24. After several cycles, the voltage across capacitor 24 reaches a level Vr which is a function of the input voltage, Vin, and the duty cycle of switch 12, S2.

In the example, the resonant frequency defined by capacitor 24 and the magnetizing inductance Lm is assumed to be much lower than the repetition frequency at which switches 12 and 10 are opened and closed. As a result, the voltage across capacitor 24 does not change during the OFF period 26 of switch 10, S1, as shown in FIG. 4 or conversely the ON time of switch 12, S2. Between time T2 and T3, the magnetizing current is described by (Vr−Vin)(T3−T2)/Lm. If the magnetizing current between T2 and T3 is set equal to the magnetizing current between T1 and T2, then (Vr−Vin)(T3−T2)=Vin(T2−T1). If the duty cycle of the switches 10 and 12 are then defined as equal to (T2−T1/(T3−T1), then Vr equals Vin/(1−D).

The output voltage, VO, of the forward converter of FIG. 3a is defined as VO=DVIN/NR, where NR is the turns ratio of transformer 18. If the output voltage is to be regulated over the range of variation of the input voltage, then the duty cycle has to vary inversely with the input voltage. In other words, the duty cycle is larger at a lower input voltage and smaller at a high input voltage.

From the expression for Vr, the resetting voltage across capacitor 24, it can be concluded that the voltage across the storage capacitor 24 does not vary over a large range provided the input voltage does not vary widely.

It can be appreciated now by viewing FIG. 3a that the energy of magnetization in transformer 18 is recycled between the input source and capacitor 24; that the variable flux swing is maximized; that the voltage stress across switch 10 is minimized to the range of the variations of the input voltage; and that there are no constraints on the duty cycle.

However, according as described below, what is avoided by the invention is the cycling of the energy of magnetization between the input source and storage capacitor through a resistive path which is formed by the resistance of switch 12 and primary 16. This resistive path causes part of the energy to be dissipated.

Further as will be shown below, according to the invention the magnetizing energy of transformer 18 is used to discharge the output capacitance of switch 10 instead of cycling it back and forth between the input source and capacitor 24.

Furthermore, the timing for switches 10 and 12 is very critical within the circuit of FIG. 3a. Particular problems arise if switch 12 does not turn OFF prior to the turn ON of switch 10. Cross-conduction between switches 10 and 12 leads to very high current spikes limited only by the conductive resistance of switches 10 and 12. Avoidance of cross conduction in a forward converter with a capacitive reset switch has long been known and the use of out-of-phase switches in the primary loop for this purpose is shown by Polikarpov et. al., "Single-Cycle Direct Voltage Regulator", Soviet Patent SU 892-614 (1981). As will be described below, according to the present invention, a predetermined delay T is used to steer the magnetizing current in order to discharge the output capacitance of the FET.

During transient variations of the duty cycle, the voltage across capacitor 24 changes. This change requires several cycles to complete and during that period, flux density in the core of transformer 18 could reach catastrophic values. As described below, the invention avoids this possibility by using current mode control. Peak magnetizing current, which is a significant portion of the primary current in transformer 18, is kept under a predetermined level which is below saturation of the core.

The methodology of the prior art does not achieve zero voltage switching of main switch 10. This results in increased stress on switch 10 and higher power losses in the converter. Avoiding cross conduction between the main and auxiliary switches as claimed by Vinciarelli '146 and others does not achieve the advantages of zero voltage switching as practiced in the invention.

Figure 1:
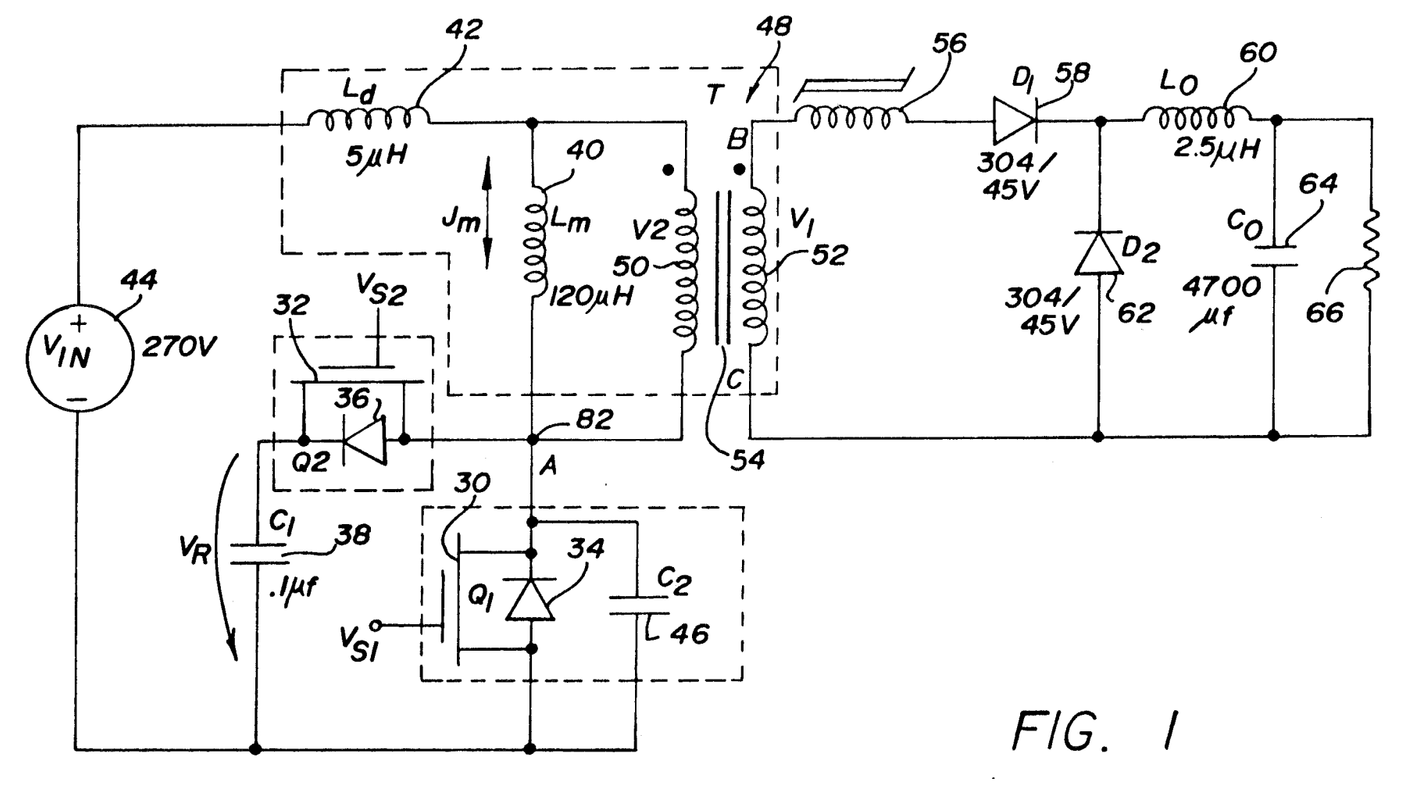
FIG. 1 is a schematic of a forward converter utilizing the resetting methodology of the invention.
Figure 2A:
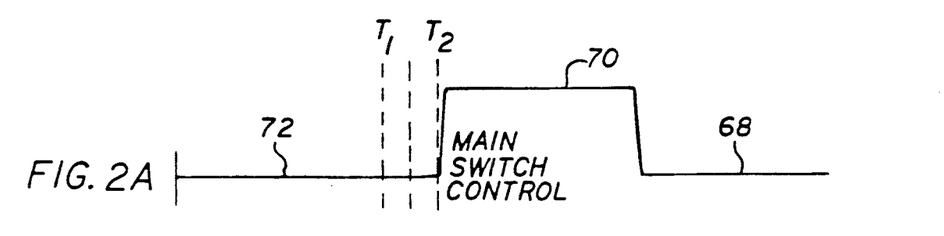
FIGS. 2a-2f are a timing diagram of the circuit of FIG. 1.
Figure 2B:
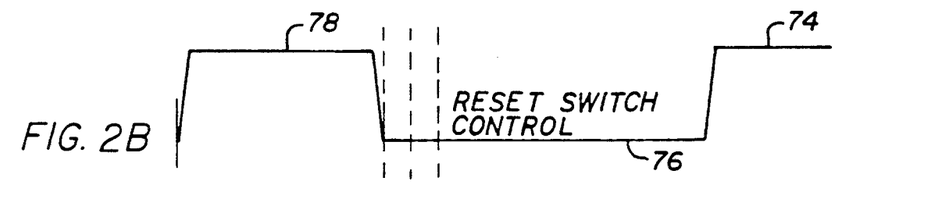
Figure 2C:
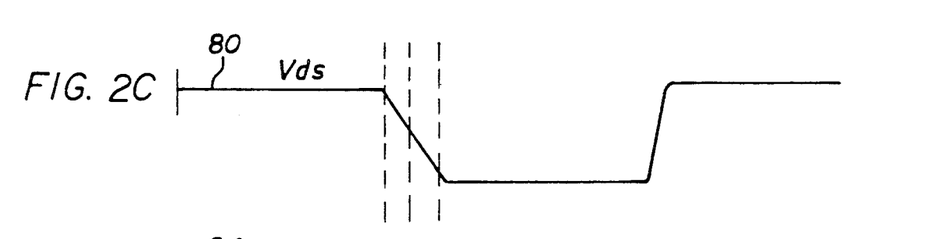
Figure 2D:
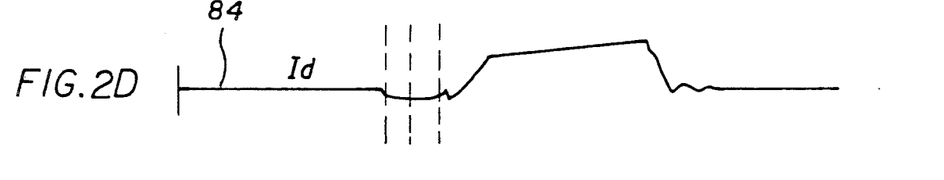
Figure 2E:
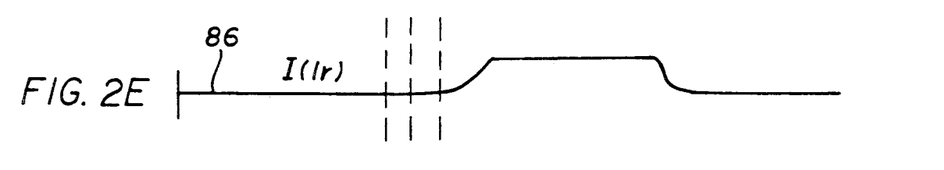
Figure 2F:
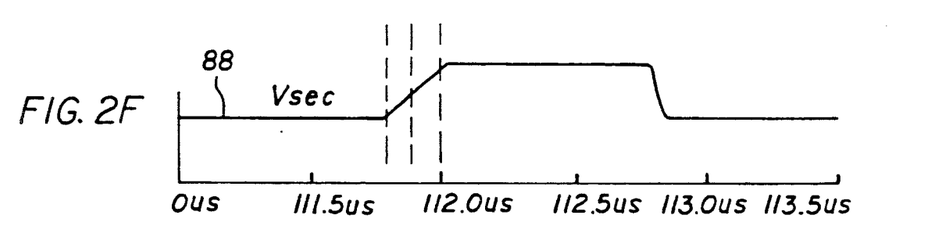

Turn now to FIG. 1 wherein the methodology of the invention is illustrated. Ideal switches 10 and 12 of FIG. 3a are replaced by MOSFETs 30 and 32 which are the preferred choice because of the existence within such devices of body diodes 34 and 36, respectively, to provide a reverse current flow through the switch without an additional external diode. In FIG. 1 the circuit equivalent of the actual MOSFET devices has been illustrated within a dotted outline. The body diodes 36 and 46 thus represent the parasitic diode within the actual MOSFET. Similarly, the circuit equivalent of transformer 48 is illustrated within a corresponding dotted outline and includes the parasitic magnetization inductance Lm and the load inductance Ld. The design of the circuit is thus made by taking into account the parasitic or actual characteristics of practical devices used in it. Control signals VS1 and VS2 are provided to the gates of MOSFETs 32 and 34 from a control circuit, the timing of which is described in connection with FIG. 2 and which is itself described in greater detail in connection with FIGS. 7 and 9. MOSFETs 32 and 34 are controlled so that there is a predetermined time interval, T, between the turn OFF of switch 32 and the turn ON of main switch 34. At the moment when reset switch 32 turns OFF, the current flowing through it flows from storage capacitor 38 through the magnetizing inductance 40, Lm, and input load inductance 42, LD, toward the input voltage source 44, Vin. The magnetizing current tries to continue its flow by flowing through capacitor 46, magnetizing inductance 40 and load inductance 42 toward the input voltage source 44. The excess energy stored within the magnetic field in transformer 48 causes body diode 34 to conduct and allows zero voltage switching to occur in switch 30. The timing delay between the switching cycles of switches 30 and 32 as shown by T in timing lines 68 and 74 of FIG. 2 is solely determined by the discharge path characteristics from switch 30 through the inductance of transformer 48 to input source 44. This in turn is affected by a third switch 56 described below.

Consider the following simplified analysis of FIG. 1. Assume for example that the drain-to-source output capacitance of each switch 30 and 32 is constant. This is actually true only if a supplementary capacitor is added in parallel with the switch, because, generally, the drain-to-source capacitance of a MOSFET is dependent upon the voltage across the MOSFET. Secondly, assume that the ON state resistance of each MOSFET switch 30 and 32 and DC resistance of primary winding 50 of transformer 48 is negligible. The current through a saturable reactor 56 is negligible for a period of time when the voltage across switch 30 decreases to zero.

In order for switch 30 to turn on at zero voltage the following equation has to be satisfied:

$$Im^2 Lm > CVr^2 \text{ where } Vr = Vin/(1-D).$$

where Im is the magnetization current flowing through transformer 46.

During the ON state of main switch 30, the magnetizing current varies by amount dI and Im=dI/2. The corresponding increment in the current flowing through the magnetization inductance Lm is DTVIN/Lm where D is the duty cycle and T is a repetition period. The magnetizing current, Im, then is one half this number. Returning to the inequality above and substituting the expressions for the resetting voltage Vr and magnetizing current Im results in the inequality:

$$1/(2LmC^{\frac{1}{2}}) > Fr/D(1-D)$$

where Fr is the repetition frequency. The left side of the inequality is the resonant frequency of the magnetizing current and the output capacitance of switch 30, which will be relabeled as a single quantity "f", the resonant frequency. The inequality can then be restated as:

$$fD(1-D) > Fr. \qquad \#1$$

The quantity D(1−D) has a maximum value at D=0.50. Therefore, main switch 30 will turn on at zero voltage provided that repetition frequency is less than a certain factor of the resonant frequency. Consider now the delay time introduced by saturable reactor 56. It is well known that the product of the peak voltage and delay time of an inductive reactor is a constant. Therefore the higher the input voltage the smaller the delay time. Also for a regulated output as described above, the higher the input voltage the smaller the duty cycle. The most critical condition for zero voltage switching is therefore experienced at high input voltage.

From the above relationship it can immediately be concluded that zero voltage switching occurs independently of the magnitude of the output current. The resonant frequency, f, of the circuit should be selected to satisfy the inequality #1 above over all input and output conditions. Since the output capacitance of switch 30 is a fixed factor due to the MOSFET structure, only the magnetizing inductance can be varied to set the resonant frequency.

Transformer 48 is comprised of a primary coil 50 and secondary coil 52 with a magnetizing core 54. Secondary coil 52 is in series circuit with a saturable inductor 56 and main diode 58. The output of the circuit is provided to a load inductance 60, a load resistance 66 and load capacitance 64, the latter two of which are in parallel with each other. A flywheel diode 62 is also coupled across the output.

The operation of the circuit of FIG. 1 is illustrated in the timing diagram of FIG. 2. Curve 68 is the gate voltage applied to main switch 30 illustrating ON state periods 70 and OFF state periods 72. Curve 74 similarly corresponds to the gate voltage applied to secondary switch 32. OFF periods 76 are alternated with ON state periods 78. However, as can be seen by comparing curves 68 and 74, a time gap T or "dead" time is provided between T1 and T2 following an ON state 78 of secondary switch 32 and before ON state 70 of main switch 30. As previously discussed 1 is determined by the discharge time of switch 30.

Similarly there is a "dead" time between times T3 and T4 following ON state 70 of main switch 30 and before ON state 78 of secondary switch 32 during which neither of switches 30 or 32 are conducting. The delay T4−T3 can be arbitrarily provided so that 0<T4−−T3<(1−D)/2Fr. Curve 80 illustrates the voltage at node 82 which represents the voltage across main switch 30. Again by comparison of curves 80 and 68 it can be appreciated that the ON state 70 of main switch 30 occurs only when the voltage across the main switch 30 is zero.

Curve 84 represents the current through main switch 30. The current through saturable inductor 56 is represented in curve 86 as will be described in greater detail below. The voltage differential across the secondary 52 of transformer 48 is depicted by curve 88. The timing relationships of the input and output voltages and currents in the primary and secondary windings of transformer 46 are illustrated in curves 80-88 of FIG. 2. As seen by comparing curves 80 and 84, positive current flows in switch 30 only after the voltage across switch 30 reaches zero. As seen in curves 88, the slope of the rising edge of the voltage across the secondary winding is decreased in proportion to the slope of the falling edge of the voltage across switch 30 as seen in curve 80, so that ringing in the secondary is significantly decreased.

Figure 5:
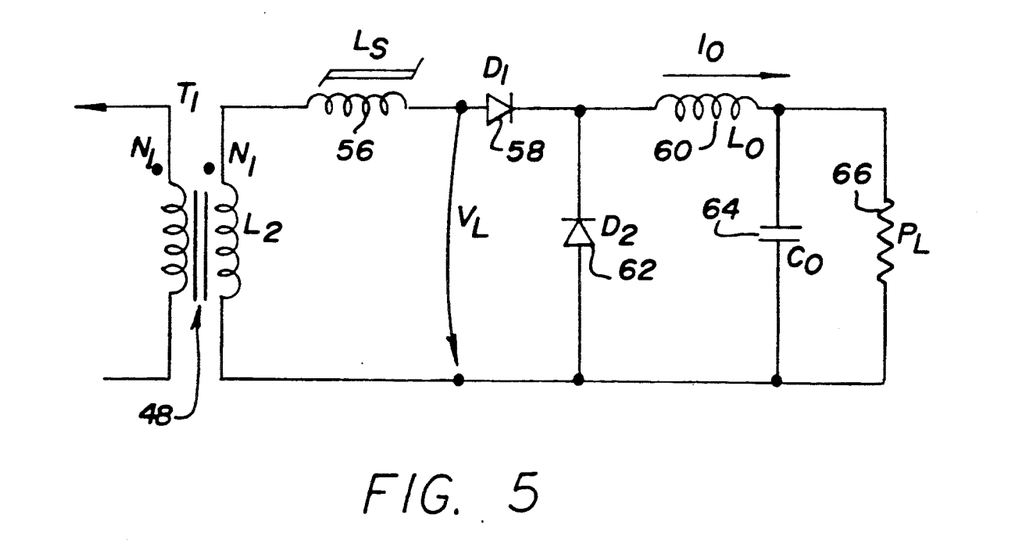
FIG. 5 is a schematic of an output stage of a converter employing a saturable reactor according to the invention.
Figure 6A:
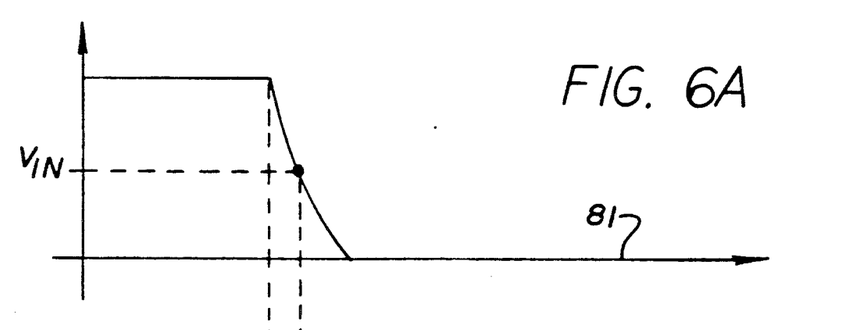
FIGS. 6a-6d are a timing diagram of the output stage of FIG. 5.
Figure 6B:
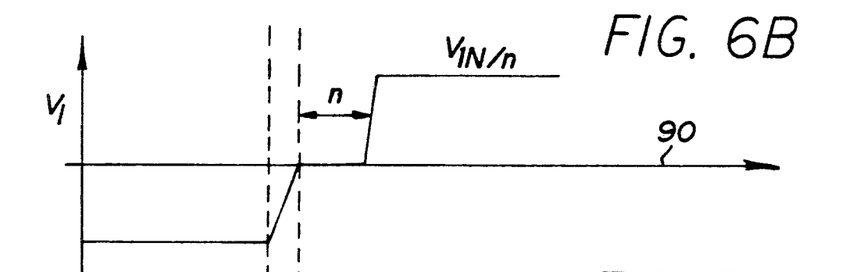
Figure 6C:
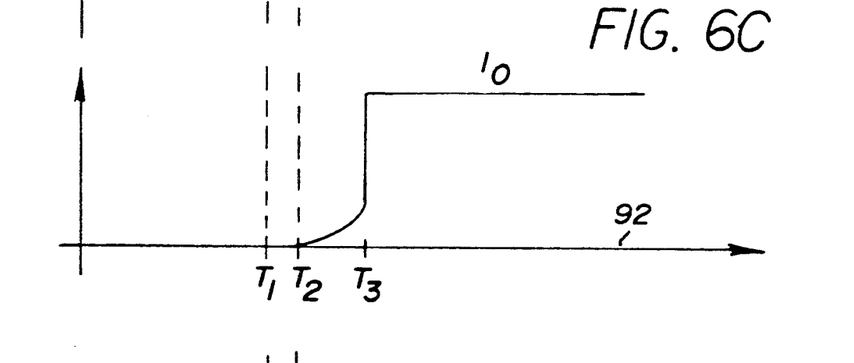
Figure 6D:
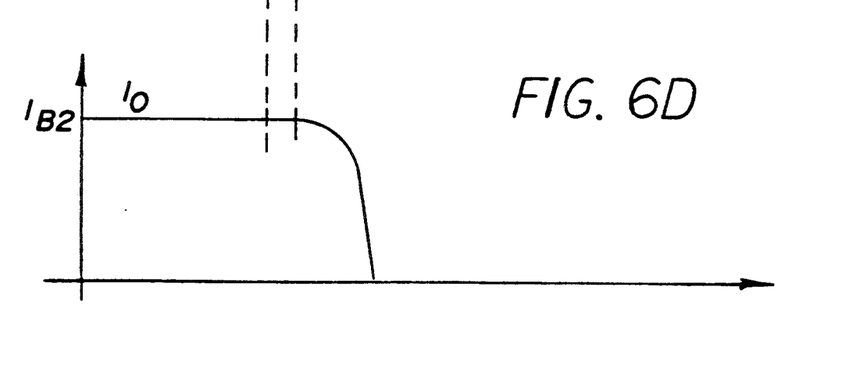

One feature of the topology of the invention is the time delay introduced by saturable inductor 56. FIG. 6 is a timing diagram which shows the relationship of several signals and the output of the circuit of FIG. 1 as shown in FIG. 5. Curve 80 again represents the voltage across main switch 30. The voltage across both saturable inductor 56 and secondary 52 is represented by the curve 90 in FIG. 5. The current through the saturable inductor, Ils, and the current flowing through flywheel diode 62 are shown on curve 92.

At time T1 auxiliary switch 32 turns OFF as shown in FIG. 2 and the magnetizing current starts to flow from the output capacitance of main switch 30, here primarily due to the capacitance of capacitor 46. This current is represented by curve 84 in FIG. 1. The voltage across main switch 30 is shown in enlarged time scale in curve 81 of FIG. 5. At the moment the voltage across main switch 30 becomes equal to the input voltage, Vin, indicated at time T2 in FIG. 6, the voltage reflected in secondary coil 52 reaches zero as depicted on curve 88 of FIG. 1. The voltage across secondary coil 52 thereafter is in the process of becoming positive.

If saturable inductor 56 were not present, main diode 58 would be forward biased and the current would flow into the secondary circuit, thereby transferring part of the energy contained in the magnetic field created by the magnetizing current to the secondary of the circuit.

If this were to occur, it would not allow enough magnetizing energy to be returned to the input source to discharge the output capacitance of main switch 30 and thus obtain zero voltage switching. To prevent this, saturable inductor 56, LS, is included in series circuit within the secondary output.

For low level currents through saturable inductor 56, inductor 56 exhibits high inductance. Once the current flowing through it reaches a predetermined level, inductor 56 saturates and effectively becomes an electrical short circuit. The time delay introduced by saturable inductor 56 is chosen to be larger than the time difference T3−T2 in FIG. 6, which is the time interval during which the voltage across main switch 30 decreases from Vin to zero.

Curve 92 shows that little current flows through saturable inductor 56 until T3 is approached. The exponential shape of the current of the saturable reactor as shown in curve 92 is typical of its saturable characteristic. Curve 90 is representative of the voltage between the anodes of main diode 58 and flywheel diode 62. Main diode 58 is back biased until at least time T2 and until current begins to flow through saturable inductor 56 at about time T3. The voltage then applied to the anode of main diode 58 is the input voltage multiplied by the turns ratio of transformer 48.

Thus it can be appreciated from FIG. 6 by comparing curves 81 and 92 that the time delay introduced by saturable inductor 56 between T2 and T3 allows for the full discharge of the output capacitance of main switch 30 and the transfer of that discharge energy through transformer 48 into the output circuit.

It must be understood that it is entirely consistent with the present invention that the time delay exhibited by saturable inductor 56 could be replaced by a synchronized switch which turns on after the voltage of main switch 30 reaches zero.

One of the drawbacks of prior art forward converters is that at the time the main switch turns OFF, the voltage rises sharply in the secondary creating current spikes which flow through the main diode and flywheel diode. To prevent this problem dissipating snubbing circuitry is required in the prior art. However, in the circuit described above, the voltage across main switch 30 decreases in a quasi-resonant fashion and at the same time the voltage reflected into the secondary exhibits a similar quasi-resonant behavior. This soft waveform in the secondary allows flywheel diode 62 to turn OFF less abruptly prior to the build up of the current through main diode 58. This operation significantly decreases the power dissipation in diode 62 and decreases the noise level.

In the context of the above description, main switch 30 and auxiliary switch 32 are gated by external control signals which are derived through conventional control circuitry. However, a control circuit according to the invention is described in connection with FIGS. 7 and 8. Turning to the schematic of FIG. 7, the circuit of FIG. 1 is shown as controlled through a current mode control.

Because a significant portion of the primary current is comprised of magnetizing current, an inner feedback loop controls the flux density in main transformer 48 by controlling the peak current. This eliminates the risk of saturation of the transformer core during transients which are associated with this resetting technique. The lack of current ringing at turn ON of main switch 30 at zero voltage and the presence of a gentle slope of the magnetizing current as shown in curve 84 of FIG. 2 makes current mode control implementation more effective and easier.

Figure 7:
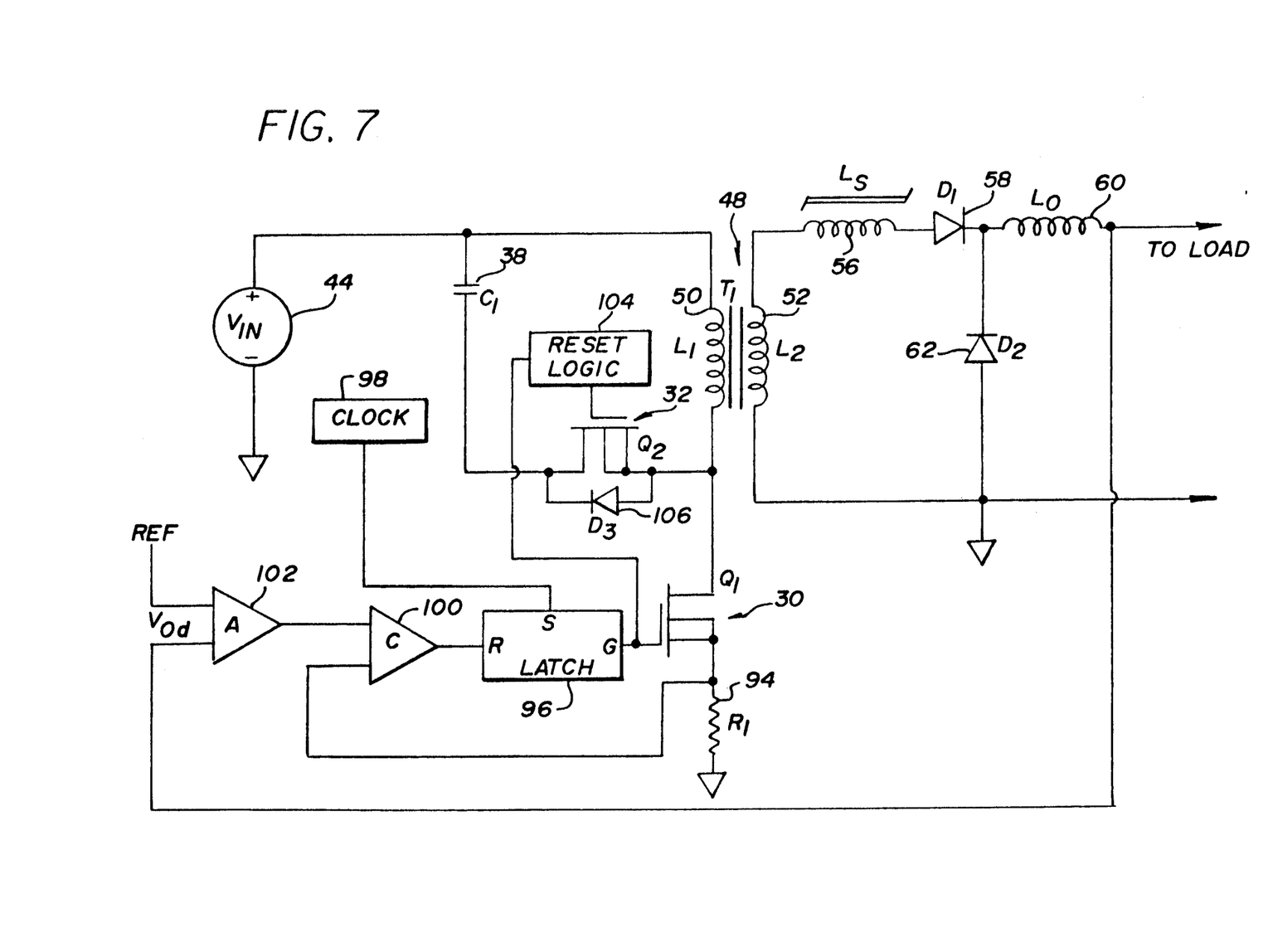
FIG. 7 is a schematic of a converter employing a current mode control according to the invention.

Turn now to FIG. 7 wherein main switch 30 is shown as resistively coupled to ground through resistor 94 for current mode control. The gate of main switch 30 is driven by latch 96 which is set by a clock 98. Latch 96 is reset by the output of a comparator 100. The inputs to comparator 100 are the voltage between the series combination of main switch 30 and resistor 94 on one hand, and the output of an error amplifier 102 on the other. Error amplifier 102 is a differential amplifier operating between a reference voltage and the output voltage coupled from the secondary circuit, namely the output load inductance 60.

The output of latch 96 is also used as a trigger signal for reset logic circuit 104. The gate of secondary transistor 32 is driven by reset logic circuit 104. Secondary switch 32 is in parallel with a antiparallel diode 106. Antiparallel diode 106 includes both internal and external diodes to transistor 32. An antiparallel diode is defined for the purposes of this specification as a diode coupled in parallel with a switch, wherein the direction of current flow through the diode is opposite to the normal direction of current flow through the switch.

Figure 8A:
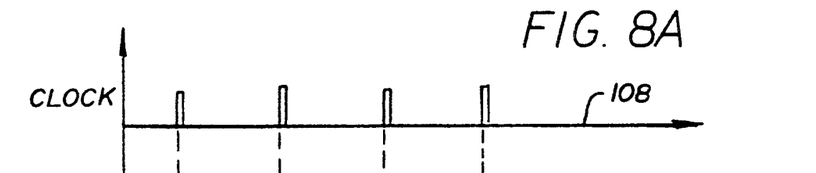
FIGS. 8a-8c are a timing diagram of the circuit of FIG. 7.
Figure 8B:
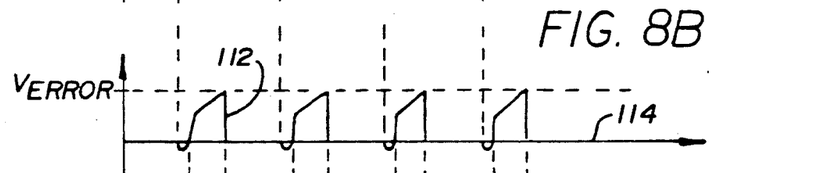
Figure 8C:
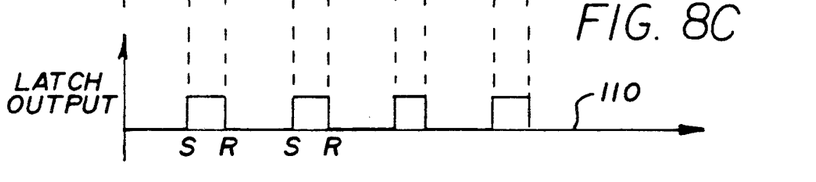

FIG. 8 is the timing diagram of the circuit of FIG. 7. Curve 108 illustrates the clock pulses generated by clock circuit 98 provided as the set signal to latch 96. The output of latch 96 is depicted on curve 110. The voltage sensed from resistor 94 is indicated by pulses 112 on curve 114. The output of error amplifier 102 is a constant voltage level, $V_{error}$, depending upon the difference, if any, between the reference voltage and the output voltage. When $V_{error}$ and the voltage at resistor 94 at the output of main switch 30 is equal, comparator 100 generates a trigger pulse which resets latch 96 as shown on curve 110. The latch output is set by clock circuit 98. The latch output shown in curve 110 is used to drive the gate of main switch 30. The same output is provided to reset logic circuit 104 for driving auxiliary switch 32 according to the teachings of the invention. The gate drive of auxiliary switch 32 will be complemented and delayed in a manner similar to that described in connection with FIG. 2 using conventional timing and logic techniques.

Figure 9:
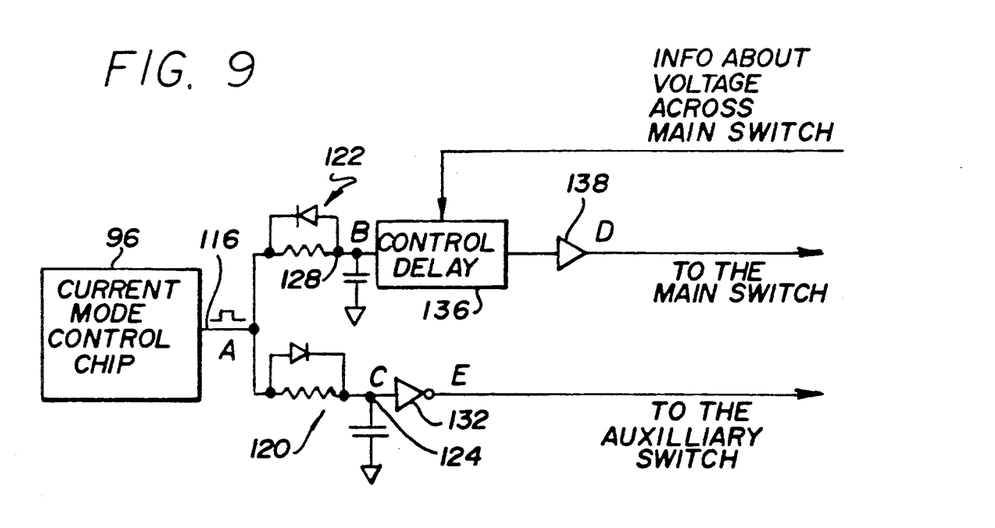
FIG. 9 is a simplified diagram illustrating control circuitry for use in combination with the circuit of FIG. 7.
Figure 10A:
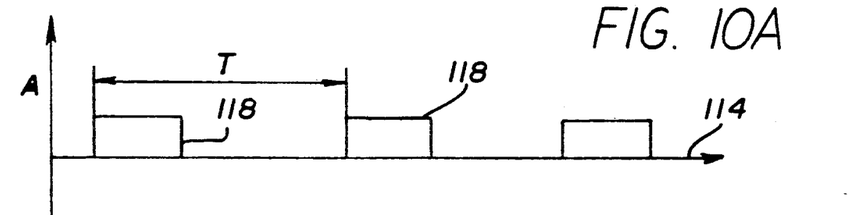
FIGS. 10a-10e are a timing diagram of the control circuitry of FIG. 9.
Figure 10B:
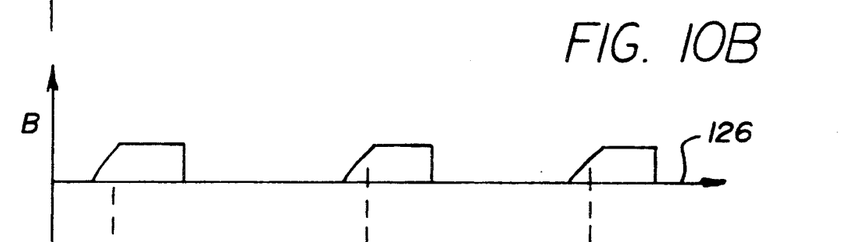
Figure 10C:
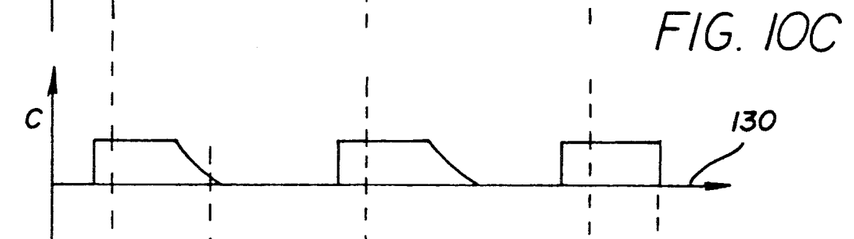
Figure 10D:
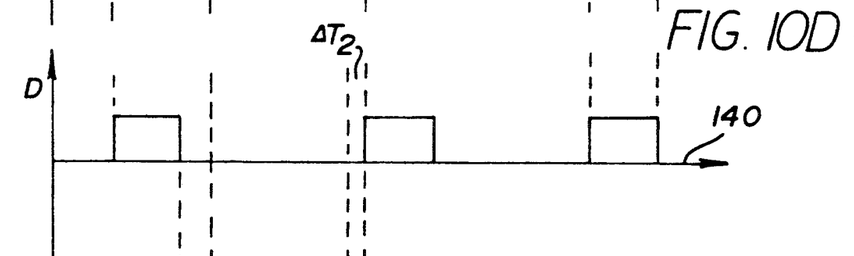
Figure 10E:
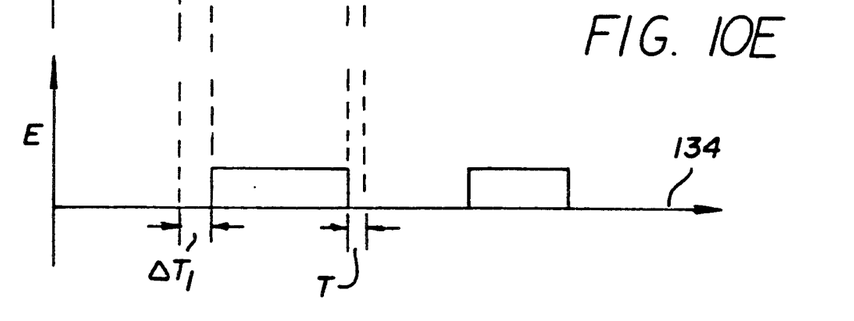

Turn now to FIG. 9 which shows a simplified block diagram for generating timing signals of the invention. FIG. 10 is a timing diagram corresponding to the circuit of FIG. 9. The current mode control output from latch 96 is shown in curve 114 in FIG. 10 and is provided at output 116 of latch 96 in FIG. 9. The time period between latch output pulses 118 is T. Pulse 118 is coupled in common to a rise time delay, generally denoted by reference numeral 120, and a fall time delay 122. The voltage at node 124 is depicted by curve 126 in FIG. 10 while the voltage at node 128 is depicted by curve 130. The filtered pulses shown in curve 120 are then input into inverter and driver 132 whose output is depicted on curve 134 of FIG. 10. These pulses are provided to auxiliary switch 32 and are delayed by time dT1 after the fall of the voltage at 124.

The pulses depicted on curve 130 may then be input into a conventional controlled delay circuit 136. The amount of delay introduced by delay circuit 136 into the pulse can be varied according to a signal which is representative of the voltage across main switch 30. The output of controlled delay circuit 136 is then coupled through a buffer 138 and is depicted on curve 140. The delay dT2 is controlled according to the voltage across main switch 30 and is provided to insure that there is a gap or dead time between the gating signal provided to switches 30 and 32 to insure the operation of the device as previously described in connection with FIGS. 2 and 6. It must be clearly understood that many other types of controllers can be utilized for timing in addition to those illustratively set forth here.

Figure 11:
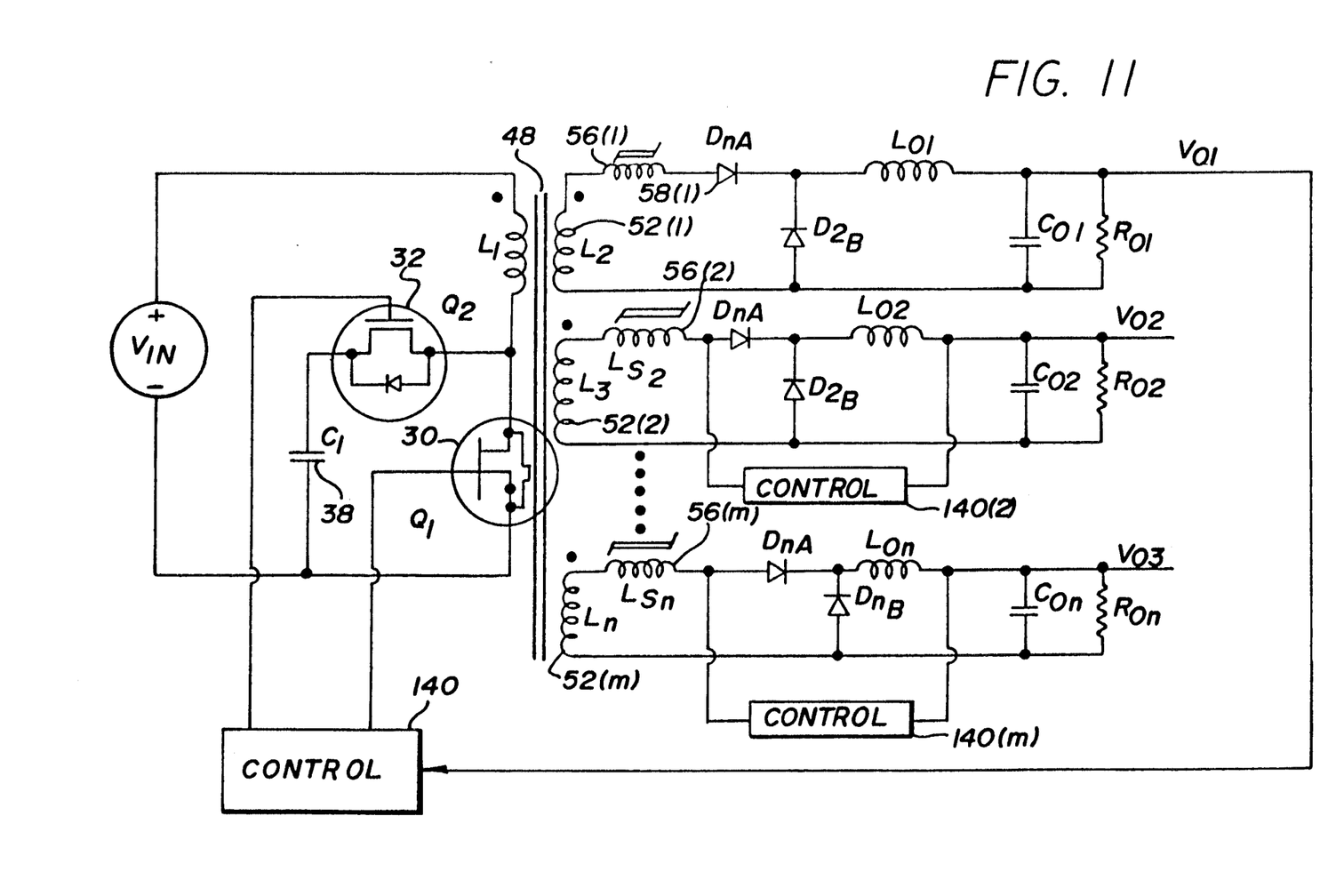
FIG. 11 is a schematic diagram of another embodiment of the invention wherein a plurality of secondary windings are included in the transformer, each with its own third switch and control circuit.

Another embodiment of the invention similar to that described in FIG. 7 is schematically illustrated in FIG. 11 where a plurality of secondary coils 52(1)-52(m) are included within transformer 48, each with a corresponding secondary output circuit. Each of the secondary circuits in FIG. 11 has its own third switch 56(1)-56(m), which is shown in each case as a saturable inductor. The first secondary circuit corresponding to coil 52(1) is provided with the feedback control described in FIG. 7 through control circuit 140. Each of the other secondary circuits corresponding to coils 52(2)-52(m) have separate corresponding control circuits 140(2)-140(m) in the secondary circuit to individually set each output circuit.

Figure 12:
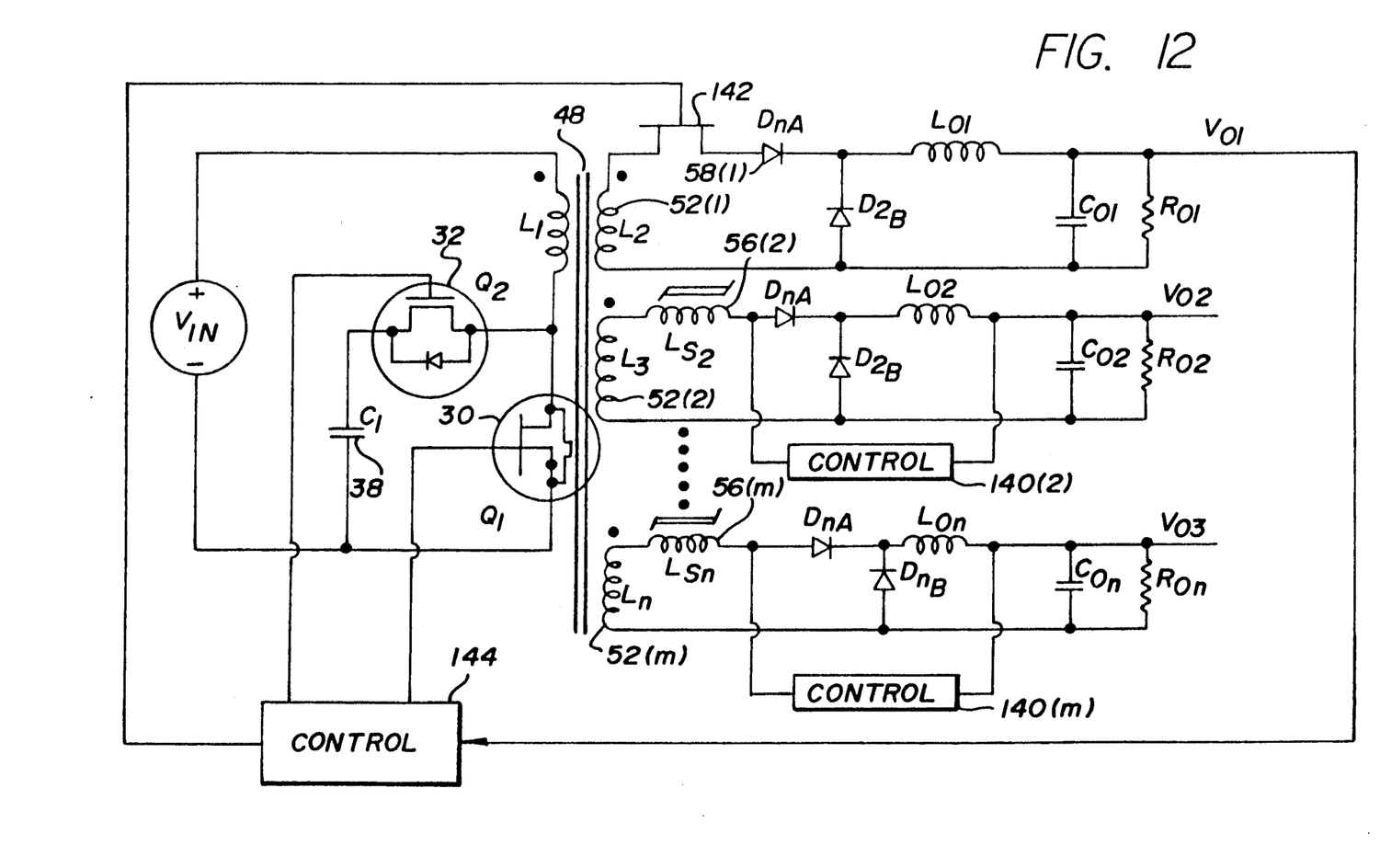
FIG. 12 is a schematic diagram of an embodiment of the invention similar to FIG. 11 where the saturable inductor used as a third switch is replaced with a synchronized switch.

Still another embodiment of the invention is depicted in FIG. 12 wherein a circuit similar to that shown in FIG. 11 where the saturable inductor of the secondary circuit corresponding to coil 52(1) has been removed and a synchronized switch 142 has been substituted in lieu thereof. Switch 142 is controlled by control circuit 144 according to the teachings of the invention to effect a zero voltage switching, which control circuit also provides the feedback control from the secondary output circuit to the primary output circuit as shown in FIGS. 7 and 11.

Many alterations and modifications may be made by those having ordinary skill in the art without departing from the spirit and scope of the invention. For example, instead of using current mode control, voltage mode control, or multiple loop feedback control can be substituted. Therefore, the invention must be understood as being set forth above only for the purposes of example and not by way of limitation. For example, any kind of switch now known or later devised may be used, including N or P type FET power devices which may be substituted for the main and auxiliary switches, the carrier type of the main and auxiliary switches may be interchanged with each other, and the reset capacitor may be connected to the positive source or return. The invention is defined by the following claims wherein means may be substituted therein for obtaining substantially the same result even when not obtained by performing substantially the same function in substantially the same way.

I claim:

1. A method of operating a fixed frequency, square wave, zero-switching DC-to-DC converter comprising the steps of:
   switching a DC voltage source to generate said square wave, said step of switching being performed by a switching means having a capacitance, a transformer being coupled to said switching means, said transformer having a primary and secondary, said switching means and primary of said transformer forming a primary side of said converter, said switching means also being provided for resetting said transformer;
   preventing resonant energy in said primary side of said converter from being transferred to said secondary to facilitate efficient discharge of said capacitance of said switching means to said zero voltage prior to resetting said transformer; and
   resetting said transformer.

2. The method of claim 1 wherein said step of preventing resonant energy in said primary side of said converter from being transferred to said secondary comprises the step of inhibiting current in said secondary by means of a saturable reactor in series with said secondary.

3. The method of claim 1 wherein said step of preventing resonant energy in said primary side of said converter from being transferred to said secondary comprises the step of inhibiting current in said secondary by means of a synchronized rectifier in series with said secondary.

4. The method of claim 1 wherein said step of preventing resonant energy in said primary side of said converter from being transferred to said secondary comprises the step of inhibiting current in said secondary by means of storing enough energy in an inductance in said primary of sufficient magnitude at said fixed frequency to discharge said capacitance of said switching means to zero voltage prior to resetting of said transformer.

5. An improvement in a square wave, fixed frequency, single ended forward converter in which energy is transferred from a primary side including a primary winding to a secondary side including a secondary winding of said converter during an ON period of a primary switch, and in which circuitry is provided for recycling the magnetizing energy stored in said transformer to reset it during the OFF period of said main switch such that discharge of output capacitance of said main switch to zero is achieved prior to turn ON of said main switch on a subsequent cycle, said converter comprising a reset capacitor, an auxiliary switch including an antiparallel diode coupled in series with said reset capacitor, switch control means operating said auxiliary switch including said antiparallel diode in accordance with a control logic such that:
   (a) said auxiliary switch including said antiparallel diode is opened prior to the ON period of said main switch,
   (b) said auxiliary switch including said antiparallel diode closes at the same time said main switch opens, and
   (c) said auxiliary switch including said antiparallel diode is open during the ON period of said main switch, said improvement comprising:
      an inductance in said primary winding of such reactance sufficient for storing enough energy so that said output capacitance of said main switch is discharged to zero voltage through said primary winding within the time period in which said auxiliary switch is open without any substantial portion of energy in said primary side of said converter being transferred to said secondary side of said converter, the opening and closing of said main switch and auxiliary switch determining said fixed frequency of said converter.

6. The converter of claim 5 further comprising means for inhibiting current in said secondary winding of said transformer until the output capacitance of said main switch is dissipated, said inhibition of current in said secondary winding allowing said inductance of said primary winding to be reduced.

7. The converter of claim 6 wherein said means for inhibiting is a saturable reactor in series circuit with said secondary winding of said transformer.

8. An improvement in a single ended, zero-voltage switching, forward, square wave, fixed frequency DC-to-DC converter having a DC voltage source, a transformer having a primary and secondary winding for transforming said square wave, main switching means for selectively coupling said voltage source across said primary winding of said transformer to generate said square wave at said fixed frequency, auxiliary switching means for selectively allowing the square wave, fixed frequency voltage across said primary winding to reach zero, said main switching means and auxiliary switching means each having an OFF period and ON period, said auxiliary switching means being nonconductive prior to said ON period of said main switching means by a predetermined time period sufficient to allow the voltage across said main switch means to reach zero voltage, said auxiliary switching means remaining nonconductive until said main switching means cycles through its corresponding ON period and OFF period, a reset capacitor coupled between said auxiliary switching means and AC ground of said converter, and a power control means for selectively operating said main switching means and auxiliary switching means at said fixed frequency to selectively transfer energy through said converter by modification of the duty cycle of operation of at least said main and auxiliary switching means to achieve turn ON of said main switching means at zero voltage, said improvement comprising:
zero voltage control means coupled in series with said secondary winding of said transformer to inhibit current in said secondary winding until the voltage across said main switching means decreases to zero; and
a first rectifying means coupled in series with said zero voltage means for conducting current from said zero voltage control means.

9. The converter of claim 8 wherein said first rectifying means and said zero voltage control means comprise a unidirectionally controlled switch means, said unidirectional controlled switch means selectively operated by said control means so that said unidirectionally controlled switching means is nonconductive after the voltage across said main switching means reaches zero, and so that said unidirectionally controlled switching means is conductive during said corresponding ON time of said main switching means.

10. The converter of claim 8 wherein said transformer comprises a plurality of secondary windings.

11. The converter of claim 8 wherein said zero voltage control means is a saturable reactor.

12. The converter of claim 8 further comprising a load and load inductor, said load inductor being coupled in series circuit between said first rectifying means and said load.

13. The converter of claim 12 further comprising a second rectifying means coupled between ground of said secondary winding of said transformer and the input to said load inductor at its coupling to said first rectifying means.

14. The converter of claim 8 wherein said control means comprises sensory means for sensing voltage across said load, said control means maintaining a constant voltage across said load by varying said ON period of said main switching means.

15. The converter of claim 8 wherein said control means comprises a sensory means for sensing voltage across said load, said control means for maintaining a constant voltage across said load by varying said ON period of said zero voltage control means.

16. The converter of claim 8 further comprising sensory means for sensing voltage across said load, said control means for maintaining a constant voltage across said load by varying said ON period of both said main switching means and said zero voltage control means.

17. The converter of claim 8 wherein said zero voltage control means is a saturable reactor.

18. The converter of claim 8 wherein said zero voltage control means is a synchronized switch.

19. A fixed frequency, square wave, zero-switching DC-to-DC converter comprising:
a DC voltage source;
switching means for switching said DC voltage source to generate said square wave, said switching means having a capacitance;
a transformer coupled to said switching means, said transformer having a primary and secondary, said switching means and primary of said transformer forming a primary side of said converter, said switching means for resetting said transformer; and
means for preventing resonant energy in said primary side of said converter from being transferred to said secondary to facilitate efficient discharge of said capacitance of said switching means to said zero voltage prior to resetting said transformer.

20. The converter of claim 19 wherein said means for preventing resonant energy in said primary side of said converter from being transferred to said secondary comprises a saturable reactor in series with said secondary.

21. The converter of claim 19 wherein said means for preventing resonant energy in said primary side of said converter from being transferred to said secondary comprises a synchronized rectifier in series with said secondary.

22. The converter of claim 19 wherein said means for preventing resonant energy in said primary side of said converter from being transferred to said secondary comprises an inductance in said primary of sufficient magnitude at said fixed frequency to store enough energy to discharge said capacitance of said switching means to zero voltage prior to resetting of said transformer.

23. A method of operating a single ended forward DC-to-DC converter comprising the steps of:
storing energy in a primary winding of a transformer by flowing DC current through said primary winding in series circuit with a main switch;
turning OFF said main switch;
providing said primary winding with an inductance of sufficient reactance to allow said output capacitance of said main switch to discharge through said primary winding without any substantial portion of resonant energy in the primary side of said converter being transferred to the secondary side of said converter;
allowing said output capacitance of said main switch to discharge through said primary winding into a secondary winding of said transformer until discharged; and
turning ON a secondary switch in series circuit with said primary of said transformer to charge a reset capacitor, said secondary switch being turned on only after there is zero voltage across said main switch.

24. The method of claim 23 further comprising the step of inhibiting current flow through said secondary winding of said transformer until said output capacitance of said main switch is completely dissipated therethrough, said inhibition of current flow through said secondary allowing said inductance of said primary winding to be reduced.

* * * * *